US010970101B2

(12) United States Patent
AbiEzzi et al.

(10) Patent No.: US 10,970,101 B2
(45) Date of Patent: Apr. 6, 2021

(54) SYSTEM AND METHOD FOR DYNAMICALLY CONFIGURING VIRTUAL DISPLAYS AND VIRTUAL INPUTS FOR DIFFERENT REMOTE SESSIONS THAT EACH PRESENT CONTENT FOR A VIRTUAL MACHINE

(71) Applicant: VMware, Inc., Palo Alto, CA (US)

(72) Inventors: Salim AbiEzzi, Sammamish, WA (US); Jeffrey W. Sheldon, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 396 days.

(21) Appl. No.: 15/172,946

(22) Filed: Jun. 3, 2016

(65) Prior Publication Data

US 2017/0351537 A1 Dec. 7, 2017

(51) Int. Cl.
*G06F 9/455* (2018.01)
*H04L 29/08* (2006.01)
(Continued)

(52) U.S. Cl.
CPC ............ *G06F 9/45558* (2013.01); *G06F 3/14* (2013.01); *G06F 3/1423* (2013.01); *G06F 9/452* (2018.02);
(Continued)

(58) Field of Classification Search
CPC ...... G06F 17/214; G06F 3/0482; G06F 9/452; G06F 9/45558; G06F 2009/45595; H04L 67/025; H04L 67/10
(Continued)

(56) References Cited

U.S. PATENT DOCUMENTS 7,149,776 B1 12/2006 Roy
8,473,958 B2 * 6/2013 Kamay ............... G06F 9/45558
718/104

(Continued)

FOREIGN PATENT DOCUMENTS

JP 2005-075314 3/2005
JP 2010-026104 2/2010
(Continued)

OTHER PUBLICATIONS

*Device Driver.* Wikipedia, The Free Encyclopedia. Last updated Mar. 29, 2016. Retrieved Apr. 5, 2016. Retrieved from the Internet: URL<en.wikipedia.org/wiki/Device_driver>. 7 pages.
(Continued)

*Primary Examiner* — Meng Ai T An
*Assistant Examiner* — Willy W Huaracha
(74) *Attorney, Agent, or Firm* — Fish & Richardson P.C.

(57) ABSTRACT

Methods, systems, and apparatus, including computer programs encoded on computer storage media, for changing virtual machine user interfaces. One of the methods includes receiving a first request from a first client device to initiate a first remote session, detecting, for the first remote session, a first display property of the first client device in response to receiving the first request, configuring, for the first remote session, a virtual display device for the virtual machine to be a display device having the first display property, receiving a second request from a second client device to initiate a second remote session, detecting, for the second remote session, a second display property of the second client device in response to receiving the second request, and configuring, for the second remote session, the virtual display device for the virtual machine to be a display device having the second display property.

17 Claims, 3 Drawing Sheets

(51) Int. Cl.
*G06F 9/451* (2018.01)
*G06F 3/14* (2006.01)
*H04L 29/06* (2006.01)

(52) U.S. Cl.
CPC ............ *H04L 67/025* (2013.01); *H04L 67/10* (2013.01); *H04L 67/38* (2013.01); *G06F 2009/45595* (2013.01)

(58) Field of Classification Search
USPC .............................................................. 718/1
See application file for complete search history.

(56) References Cited

U.S. PATENT DOCUMENTS

| | | | |
|---|---|---|---|
| 8,924,862 | B1 | 12/2014 | Luo |
| 8,970,492 | B2* | 3/2015 | Butner ................ G06F 3/0488 345/157 |
| 9,158,434 | B2 | 10/2015 | Beveridge |
| 9,167,020 | B2 | 10/2015 | Abdo |
| 9,295,915 | B2 | 3/2016 | Bruno, Jr. et al. |
| 9,565,227 | B1 | 2/2017 | Helter |
| 9,628,332 | B2 | 4/2017 | Bruno, Jr. |
| 2004/0010622 | A1 | 1/2004 | O'Neill |
| 2006/0075106 | A1 | 4/2006 | Hochmuth |
| 2007/0208808 | A1 | 9/2007 | Rust |
| 2009/0112808 | A1 | 4/2009 | Howcroft |
| 2009/0235177 | A1* | 9/2009 | Saul ..................... G06F 3/0227 715/740 |
| 2010/0106798 | A1 | 4/2010 | Barreto et al. |
| 2010/0135296 | A1 | 6/2010 | Hwang |
| 2010/0169790 | A1 | 7/2010 | Vaughan |
| 2010/0269046 | A1* | 10/2010 | Pahlavan ............. G06F 3/1462 715/740 |
| 2010/0306642 | A1 | 12/2010 | Lowet |
| 2011/0138295 | A1 | 6/2011 | Monnchilov |
| 2011/0246891 | A1* | 10/2011 | Schubert ............... G06F 9/452 715/719 |
| 2011/0295974 | A1 | 12/2011 | Kashef |
| 2012/0204093 | A1 | 8/2012 | Habarakada |
| 2012/0324358 | A1 | 12/2012 | Jooste |
| 2013/0086212 | A1 | 4/2013 | MacInnis |
| 2013/0097488 | A1 | 4/2013 | Coman et al. |
| 2013/0290856 | A1 | 10/2013 | Beveridge et al. |
| 2013/0290858 | A1* | 10/2013 | Beveridge ............ G06F 3/0484 715/740 |
| 2013/0346564 | A1 | 12/2013 | Warrick |
| 2014/0026057 | A1* | 1/2014 | Kimpton ................ G06F 9/451 715/733 |
| 2014/0215457 | A1 | 7/2014 | Gava |
| 2014/0258872 | A1 | 9/2014 | Spracklen |
| 2014/0316990 | A1 | 10/2014 | Winston |
| 2014/0325374 | A1* | 10/2014 | Dabrowski ............ G06F 9/451 715/744 |
| 2014/0344332 | A1 | 11/2014 | Giebler et al. |
| 2014/0355189 | A1 | 12/2014 | Nakano |
| 2015/0062183 | A1 | 3/2015 | Hong |
| 2015/0089426 | A1 | 3/2015 | Ukai |
| 2015/0134840 | A1 | 5/2015 | Thompson et al. |
| 2015/0172760 | A1 | 6/2015 | AbiEzzi et al. |
| 2015/0199308 | A1 | 7/2015 | Cooper |
| 2016/0044088 | A1* | 2/2016 | Momchilov ............ G06F 3/14 715/740 |
| 2016/0191604 | A1 | 6/2016 | AbiEzzi et al. |
| 2016/0219084 | A1 | 7/2016 | AbiEzzi |
| 2016/0246560 | A1* | 8/2016 | Petrov .................... G06F 9/452 |
| 2016/0248838 | A1 | 8/2016 | AbiEzzi et al. |
| 2016/0249006 | A1 | 8/2016 | Park et al. |
| 2016/0283070 | A1 | 9/2016 | AbiEzzi |
| 2016/0285956 | A1 | 9/2016 | AbiEzzi |
| 2017/0185438 | A1 | 6/2017 | Thomas et al. |
| 2017/0300966 | A1 | 10/2017 | Dereszynski |
| 2020/0045097 | A1 | 2/2020 | AbiEzzi et al. |

FOREIGN PATENT DOCUMENTS

| | | |
|---|---|---|
| JP | 2010-126092 | 6/2010 |
| JP | 5994659 | 9/2016 |
| WO | WO 2013/168368 | 11/2013 |

OTHER PUBLICATIONS

*Write Once, Run Anywhere.* Wikipedia, The Free Encyclopedia. Last updated Nov. 20, 2015. Retrieved Apr. 5, 2016. Retrieved from the Internet: URL<n.wikipedia.org/wiki/Write_once,_run_anywhere>. 2 pages.

Gear, David Pierce. *Surface Book is the Laptop Microsoft Needed Years Ago.* Wired. Published Oct. 6, 2015. Retrieved Feb. 5, 2016. Retrieved from the Internet: URL.wired.com/2015/10/surface-book-future-of-windows/>. 10 pages.

U.S. Appl. No. 15/191,927, AbiEzzi et al, filed Jun. 24, 2016.

International Search Report and Written Opinion in International Application No. PCT/JP2013/002600, dated Jun. 11, 2013, 17 pages (English Translation).

Massey, Sean P. *Horizon View 5.3 Part 13—VMware Blast.* The Virtual Horizon. Publication Feb. 25, 2014. Retrieved Feb. 5, 2016. Retrieved from the Internet: URL<hevirtualhorizon.com/2014/02/25/horizon-view-5-3-part-13-vmware-blast/>. 9 pages.

* cited by examiner

SYSTEM AND METHOD FOR DYNAMICALLY CONFIGURING VIRTUAL DISPLAYS AND VIRTUAL INPUTS FOR DIFFERENT REMOTE SESSIONS THAT EACH PRESENT CONTENT FOR A VIRTUAL MACHINE

BACKGROUND

This specification relates to virtual machines.

A virtual machine is a software-based abstraction of a physical computer system. In general, any computer program that can be executed on a physical computer system can be executed in a virtual machine using virtualization software. Virtualization software is software that is logically interposed and interfaces with a virtual machine and a physical computer system. Each virtual machine is configured to execute an operating system (OS), referred to herein as a guest OS, and applications. A physical computer system, referred to herein as a host machine, can execute one or more virtual machines. A host system may include one or more host machines, e.g., one or more servers.

A virtual machine can be accessed remotely through a network connection. For example, it is possible to use a remote client to access a virtual machine remotely. A remote client is a program that communicates user interface information with a remote system. Generally, the user interface information includes display data, which is received from the remote system and displayed locally to the user, and the remote client sends inputs generated by the user to the remote system. In this way, applications executing remotely from the user can be accessed and interacted with by the user.

SUMMARY

A server may receive a request to access an application from a user device. For instance, the server may receive a request that indicates that the user device wants to create a session with a virtual machine to access the application executing on the virtual machine, data available from the virtual machine, or both.

In some implementations, the server may execute a workspace service, e.g., an application aggregation service. The workspace service may perform user authentication, application selection or application authorization or both, session initiation, or a combination of two or more of these. The workspace service may determine applications available to the user device, e.g., based on authentication of a user account for the user device which indicates the applications available to the user device.

The server may, upon creation of a connection with a user device by the workspace service, detect properties of the user device and cause a virtual machine to mirror the capabilities of the user device by dynamically configuring user interface presentation settings and input settings, e.g., using hot plug and unplug options, for a user session with the user device. The server configures the settings for the virtual machine differently when a different device, with different display and input functionality, requests a user session with the virtual machine. The server may include a hypervisor that causes the virtual machine to mirror the capabilities of the user device. In some examples, the workspace service causes the virtual machine to mirror the capabilities of the user device, e.g., by invoking mechanisms of the virtual machine exposed by the hypervisor.

For instance, the workspace service detects a request for an application session from a first device, e.g., a laptop. The workspace service requests the hypervisor to bring up a virtual machine session for the first device and causes the virtual machine to configure presentation settings of the virtual machine so that a user interface being provided to the first device is specific to the first device, e.g., a user interface resolution and sizes of menu options, and so that user input options for interacting with the user interface are specific to the first device, e.g., a keyboard and a mouse. When the workspace service receives a second request for a session for the same application and user account, e.g., when the user switches devices and requests access to the workspace service or access to the application, the workspace service may communicate with the hypervisor to adapt the virtual machine according to the second, different device, e.g., a smart phone. For instance, the hypervisor causes the virtual machine to change settings, e.g., using hot plugging and unplugging, to customize the user interface for the second device, e.g., by changing the resolution and making menu options larger, e.g., touch friendly, and to customize the user input options for interacting with the user interface, e.g., by hot unplugging the keyboard and mouse and hot plugging a touch screen interface option.

In response to the change in the virtual machine, the operating system or the running application dynamically switches to a different code path to serve a different presentation of the user interface for seamlessly resuming the application without needing to execute a different version of the application that is specific to a particular type of device, e.g., the device for the second session. For example, the virtual machine executes only a single version of an application and adjusts the user interface and input options for different types of devices in response to hot plugging and unplugging of virtual devices, e.g., virtual device drivers, without requiring the execution of an application that is specific to one type of device which does not provide a user friendly interface for another type of device, e.g., when an application designed to execute on a laptop would be difficult to interact with when executing on a phone because the menu options may be too small for a user to read, select, or both.

In general, one innovative aspect of the subject matter described in this specification can be embodied in methods that include the actions of receiving a first request from a first client device to initiate a first remote session that allows a user to remotely interact with one or more applications executing on a virtual machine, detecting, for the first remote session, a first display property of the first client device in response to receiving the first request to initiate the first remote session that allows the user to remotely interact with the one or more applications executing on the virtual machine, configuring, for the first remote session, a virtual display device for the virtual machine to be a display device having the first display property, receiving a second request from a second client device to initiate a second remote session that allows the user to remotely interact with the one or more applications executing on the virtual machine, detecting, for the second remote session, a second display property of the second client device in response to receiving the second request to initiate the second remote session that allows the user to remotely interact with the one or more applications executing on the virtual machine, and configuring, for the second remote session, the virtual display device for the virtual machine to be a display device having the second display property. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving a first request from a first client device to initiate a first remote session that allows a user to remotely interact with one or more applications executing on a virtual machine, detecting, for the first remote session, a first input property of the first client device in response to receiving the first request to initiate the first remote session that allows the user to remotely interact with the one or more applications executing on the virtual machine, configuring, for the first remote session, a virtual input device for the virtual machine to be an input device having the first input property, receiving a second request from a second client device to initiate a second remote session that allows the user to remotely interact with the one or more applications executing on the virtual machine, detecting, for the second remote session, a second input property of the second client device in response to receiving the second request to initiate the second remote session that allows the user to remotely interact with the one or more applications executing on the virtual machine, and configuring, for the second remote session, the virtual input device for the virtual machine to be an input device having the second input property. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. The method may include detecting, for the first remote session, an input property of the first client device in response to receiving the first request from the first client device to initiate the first remote session that allows the user to remotely interact with the one or more applications executing on the virtual machine, and configuring, for the first remote session, a virtual input device for the virtual machine to be an input device having the input property. Configuring the virtual input device for the virtual machine to be an input device having the input property may include configuring an input driver to have the input property. The method may include determining, for the first remote session, a type of input device using the input property, selecting, for the first remote session, one of a plurality of menu types using the type of input device, and presenting, for the first remote session, the selected one of the plurality of menu types in response to selecting the one of the plurality of menu types using the type of input device. Determining the type of input device using the input property may include determining whether the first client device receives (i) touch based input or (ii) mouse and keyboard input using the input property. Selecting one of the plurality of menu types using the type of input device may include selecting a (i) touch interface menu or (ii) a mouse interface menu using the determined type of input.

In some implementations, the method may include determining, for the first remote session, first display options for the virtual display device using the first display property, generating, for the first remote session, instructions for a presentation of the first display options for the virtual display device, determining, for the second remote session, second display options for the virtual display device using the second display property, and generating, for the second remote session, instructions for a presentation of the second display options for the virtual display device, the second display options having at least one option that is not included on the first display options. Generating the instructions for the presentation of the first display options for the virtual display device may include generating the instructions for a presentation of an option to select a font size from a first group of font sizes for text presented during the first remote session. Generating the instructions for the presentation of the second display options for the virtual display device may include generating the instructions for a presentation of an option to select a font size from a second group of font sizes for text presented during the second remote session, at least one of the font sizes in the first group of font sizes not included in the second group of font sizes. The method may include providing, to the first client device for the first remote session, the instructions for a presentation of the first display options for the virtual display device to cause the first client device to present the first display options, and providing, to the second client device for the second remote session, the instructions for a presentation of the second display options for the virtual display device to cause the second client device to present the second display options.

In some implementations, receiving the first request from the first client device to initiate the first remote session that allows the user to remotely interact with the one or more applications executing on the virtual machine may include receiving the first request from a laptop or a desktop to initiate the first remote session that allows the user to remotely interact with the one or more applications executing on the virtual machine. Detecting the first display property of the first client device may include detecting a first property for a first display for (i) the laptop or (ii) the desktop in response to receiving the first request to initiate the first remote session that allows the user to remotely interact with the one or more applications executing on the virtual machine. Configuring the virtual display device for the virtual machine to be a display device having the first display property may include configuring the virtual display device for the virtual machine to be a display device having the first property for the first display for (i) the laptop or (ii) the desktop. Receiving the second request from the second client device to initiate the second remote session that allows the user to remotely interact with the one or more applications executing on the virtual machine may include receiving the second request from a smart phone to initiate the second remote session that allows the user to remotely interact with the one or more applications executing on the virtual machine. Detecting the second display property of the second client device may include detecting a second property of a second display included in the phone in response to receiving the second request to initiate the second remote session that allows the user to remotely interact with the one or more applications executing on the virtual machine. Configuring the virtual display device for the virtual machine to be a display device having the second display property may include configuring the virtual display device for the virtual machine to be a display device having the second property of the second display instead of a display device having the property of the display for (i) the laptop or (ii) the desktop. The method may include detecting, for the first remote session, keyboard properties and mouse properties for the laptop or the desktop, configuring, for the first remote session, a virtual mouse input device for the virtual machine to be an input device having the mouse properties, configuring, for the first remote session, a virtual keyboard input device for the virtual machine to be an input device having the keyboard properties, detecting, for the second remote session, touch screen properties of a touch screen for the phone, configuring, for the second remote session, a virtual touch screen for the virtual machine to be an input device having the touch screen properties, and disabling, for the second remote session, the virtual mouse input device. The second display included in the phone may include the touch screen display.

In some implementations, configuring the virtual display device for the virtual machine to be a display device having the first display property may include configuring a display driver to have the first display property. The one or more applications executing on the virtual machine may not include special mechanisms to execute on a virtual machine. In some implementations, one or more computers may execute the method. The one or more computers may include a server operable to interact with the device through a data communication network. Both the first client device and the second client device may be configured to interact with the server as a client. The first client device may be a personal computer. The second client device may be a mobile telephone or a tablet. The method may include detecting, for the first remote session, a display property of the first client device in response to receiving the first request from the first client device to initiate the first remote session that allows the user to remotely interact with the one or more applications executing on the virtual machine, and configuring, for the first remote session, a virtual display device for the virtual machine to be a display device having the display property. The method may include determining, for the first remote session, a type of display device using the display property, selecting, for the first remote session, one of a plurality of menu types using the type of display device, and presenting, for the first remote session, the selected one of the plurality of menu types in response to selecting the one of the plurality of menu types using the type of display device The subject matter described in this specification can be implemented in particular embodiments and may result in one or more of the following advantages. In some implementations, the systems and methods described below may allow different types of devices to create a new application session, e.g., with a virtual machine, so that the virtual machine automatically adapts a presentation of a user interface from one session to a subsequent session by changing virtual presentation drivers for the virtual machine. In some implementations, the systems and methods described below may use device drivers to change a presentation format for an application executing on a virtual machine, e.g., to cause an application to change a user interface based on the presentation format. In some implementations, the systems and methods described below may provide a seamless cross-device experience when resuming an application session on a different device, e.g., with different display hardware. For example, when resuming an application session on a different device, a system detects properties of the different device, e.g., compared to the properties of a first device for which an application session was previously executing, and selects a code path specific to the different device and not the first device for a seamless presentation of the application session across devices, e.g., without scaling the user interface for the first device to fit a display size for the different device which may cause the user interface to be difficult to use on the different device.

In some implementations, the systems and methods described below may simplify cross device application development by allowing development of a single application that is stored and executed at a central location, e.g., on a host system executing a virtual machine, when a user interface for the single application is presented on different devices. The systems and methods described below may enable presentation of an application designed for one type of operating system or hardware on an end user device that has a different operating system, e.g., version or type; different hardware; or both. For instance, a system may enable a first end user device with a first operating system to interact with an application, executing on the virtual machine, that is for a second, different operating system, e.g., when the application was written, compiled, or both, for the second, different operating system.

In some implementations, the systems and methods described below may allow a developer to provision, secure (e.g., harden or perform threat analysis on), or both, a single application designed for a particular device, platform, or both, while providing access to the single application on multiple different types of devices, multiple different types of platforms, or both. For instance, the single application may be a particular operating system or an application developed to execute on the particular operating system, e.g., without any knowledge or special mechanisms to run in the cloud, execute on a virtual machine, or both. The single application may be a guest operating system of a virtual machine or an application executing on the guest operating system. The single application may be developed with multiple code paths for different display properties, different input properties, or both. The systems and methods described below may use the multiple code paths of the single application to dynamically configure presentation of the single application to seamlessly present content on different devices with different display properties, input properties, or both, across sessions with a virtual machine. For example, the systems and methods described below may allow the single application, with multiple code paths, to execute on a virtual machine and present content to multiple different devices without modification to the single application and when the single application was not developed to execute on some of the multiple different devices, e.g., because of the hardware, software, or both, of the some of the multiple different devices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A host system, e.g., a workspace service, a hypervisor, or both, may cause an application to dynamically change a presentation of a user interface of the application by changing device drivers for virtual hardware included in a virtual machine executing the application. For example, the host system may change a display resolution, a display orientation, or both, for the virtual machine using hot pluggable devices for the virtual machine to cause the application to change a presentation of the user interface. The host system may change an input device for the virtual machine, e.g., from a "physical keyboard" to a "touch screen" input by unplugging the keyboard in the virtual machine and plugging in the touch screen.

For instance, a workspace service, executing on the host system, receives a request to access a particular application from an end user device. The workspace service receives user credential information from the end user device and authenticates the end user device.

The host system determines characteristics of the end user device, e.g., display properties and input properties of the end user device. The host system configures a virtual machine for the end user device using the characteristics of the end user device, e.g., to cause the virtual machine to mirror the display capabilities, the input capabilities, or both, of the end user device. For instance, the workspace service, or another application on the host system, determines that the particular application was executing on the virtual machine during a most recent session for a user account associated with the user credential information and causes the virtual machine to resume the particular application. The particular application determines the characteristics of the end user device, based on the virtual hardware of the virtual machine, and generates a user interface using the characteristics of the end user device.

The host system enables multiple different types of end user devices to create sessions with the particular application while the particular application customizes its user interface for the particular end user device to which a virtual machine executing the particular application is connected. For example, after a session with the first end user device ends, the host system may receive a request for a new session with the particular application from a second end user device, e.g., that executes the second operating system or a third operating system different from the first and the second operating systems. The host system causes the particular application to customize the presentation of the particular application's user interface for the second end user device to enable the second end user device to present the user interface and receive user input for the particular application, e.g., by causing the particular application to execute a code path for the second end user device rather than a code path for the first end user device.

Figure 1:
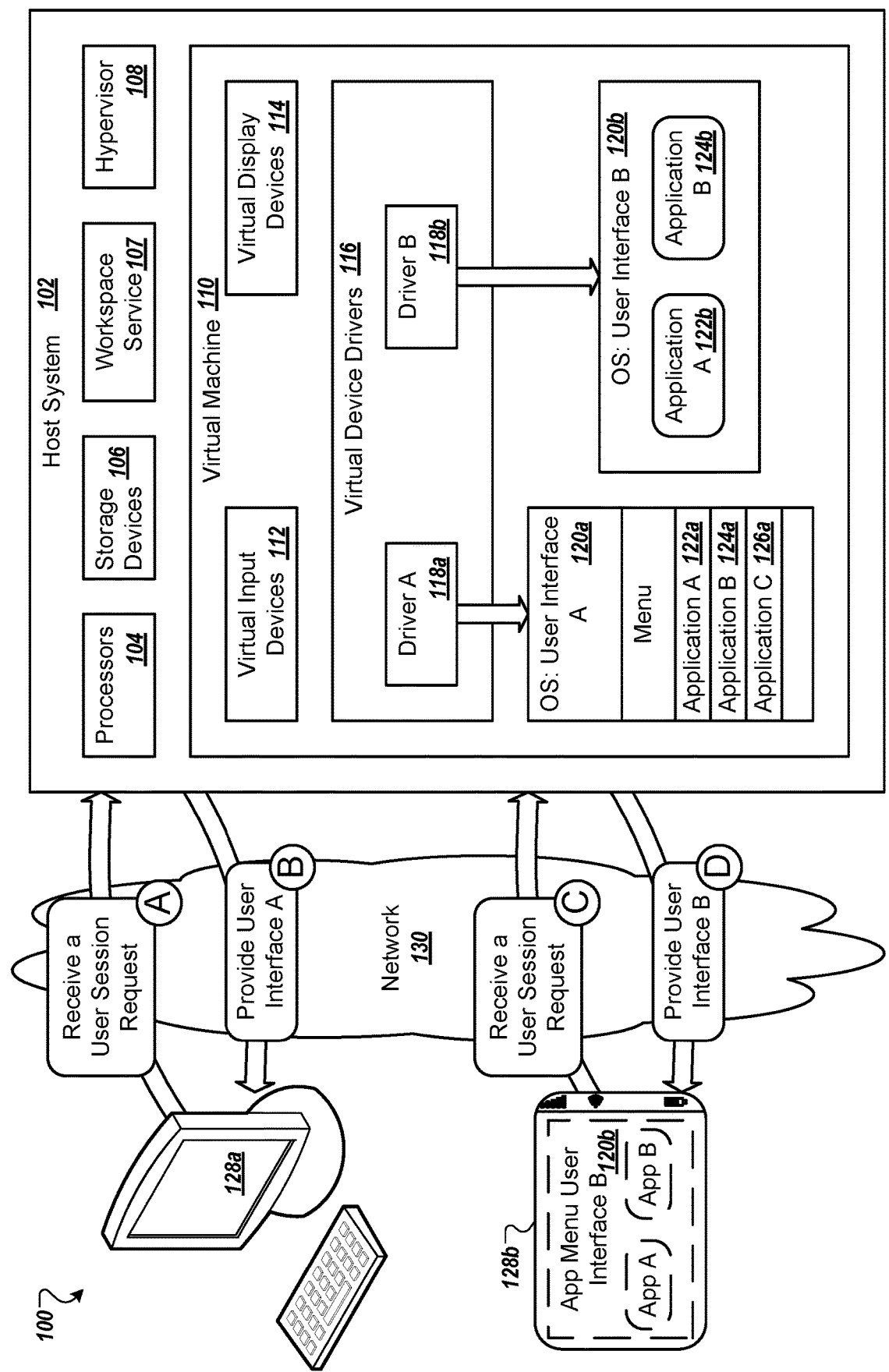
FIG. 1 is an example of an environment in which a host system provides different types of client devices access to a virtual machine.

FIG. 1 is an example of an environment 100 in which a host system 102 provides different types of client devices 128a-b access to a virtual machine 110. The host system 102 may include one or more physical computers. The host system 102 includes physical hardware 104 and 106. For instance, the host system includes one or more physical processors 104 and one or more physical storage devices 106.

The host system 102 may include a workspace service 107. The workspace service 107 may perform user authentication, application selection or application authorization or both, session initiation, or a combination of two or more of these.

The host system 102 includes a hypervisor 108 that causes the execution of virtual machines, including a virtual machine 110, on the host system 102 and monitors the execution of the virtual machines on the host system 102.

At time $T_A$, the workspace service 107 receives a request from a first client device 128a, e.g., a physical desktop computer, for a first user session with the virtual machine 110. The request for the first user session may indicate a particular application to which the first client device 128a is requesting access, a particular set of applications, e.g., for which an account for the first client device 128a indicates the first client device 128a has access, or a virtual machine.

For instance, the workspace service 107 may receive a message from the first client device 128a that requests a connection, over a network 130, with a virtual machine executing one or more applications to allow the first client device 128a to remotely interact with the applications. The workspace service 107 may receive a message that identifies a particular type of virtual machine, e.g., operating system for the virtual machine, execution of a particular application by a virtual machine, or both, from the first client device 128a. In some examples, the workspace service 107 may determine the particular application for the first user session based on account information for the first client device 128a, as described in more detail below.

In some implementations, the workspace service 107 may receive user credential information from the first client device 128a, with the request or in a separate message. The workspace service 107 authenticates the user credential information, e.g., by determining a user account for the user credential information and the first client device 128a. In some examples, another part of the host system 102 may authenticate the first user session with the first client device 128a.

The workspace service 107 uses the user account to determine a virtual machine 110 to cause to be executed on the host system 102 and settings for the virtual machine 110. For instance, the workspace service 107 uses the user account to determine an operating system for the virtual machine 110, applications for the virtual machine 110, and user settings for the virtual machine 110. In some implementations, another part of the host system 102 may determine the settings for the virtual machine 110.

The workspace service 107 determines device properties for the first client device 128a. The workspace service 107 may determine the device properties using data included in the request for the first user session, received at time $T_A$. In some examples, the workspace service 107 sends a message to the first client device 128a requesting data identifying one or more device properties for the first client device 128a. In response, the workspace service 107 receives a message from the first client device 128a that includes data identifying the one or more device properties for the first client device.

For instance, the workspace service 107 may determine a presentation format and an input format for the first client device 128a. The presentation format and the input format may each include respective properties for the first client device 128a.

The presentation format may indicate display properties of an external display connected to the first client device 128a, e.g., when the first client device 128a is a desktop computer. In some examples, the presentation format may indicate whether the first client device 128a presents audible information for applications, presents stereo three-dimensional information, head mounted displays, or any other appropriate type of presentation data. Some examples of display properties include a display resolution, a display orientation, e.g., landscape or portrait, and color settings for a display.

In some implementations, the presentation format may include a display technology of a display that will present content generated by the virtual machine 110, e.g., a display for the first client device 128a. For instance, the host system 102 may determine whether the display is an organic light emitting diode (OLED) display, e.g., that may use a "dark" user interface approach to light up fewer pixels to save power, a liquid crystal display, or another appropriate type of display technology. In some examples, the host system 102 may determine a refresh rate of the display. For instance, the host system 102 may determine a frequency refresh rate that represents a number of times content is presented within a second, e.g., for a traditional display, or a frequency refresh rate that represents a number of seconds between each refresh, e.g., for an e-ink display.

The input format for the first client device 128a may indicate that the first client device 128a receives input from a keyboard, a mouse, IR remote control, a touch screen, e.g., integrated into the external display, or two or more of these. In some examples, the workspace service 107 may determine that the input format indicates that the first client device 128a accepts speech input.

The host system 102 configures virtual input devices 112 and virtual display devices 114 of the virtual machine 110 using the presentation format and input format for the first client device 128a. For instance, the host system 102, e.g., the workspace service 107, the hypervisor 108, or both, may configure the virtual devices by selecting virtual drivers from multiple virtual device drivers 116 using the presentation format and the input format. The host system 102 may select a driver A 118a from the virtual device drivers 116 using the presentation format for the first client device 128a.

The host system 102 configures the virtual machine 110 using the determined drivers from the multiple virtual device drivers 116. For instance, the host system 102 causes the virtual machine 110 to load the driver A 118a for the virtual display devices 114 so that the virtual machine 110 generates instructions for presentation of a user interface based on the presentation format of the first client device 128a.

The loading of the driver A 118a in the virtual machine 110 causes the virtual machine to simulate the display of the first client device 128a as the virtual display device 114. For instance, the virtual display device 114 has the same resolution, orientation, and other display properties as the display of the first client device 128a.

In some implementations, the host system 102 may configure the virtual devices 112, 114, or both, by morphing a particular virtual driver for the virtual machine 110 in addition to or instead of causing the virtual machine 110 to load a particular driver from the virtual device drivers 116. For instance, the host system 102 may change or cause a change to properties of a particular virtual driver used by the virtual machine 110 for the virtual display device 114. The host system 102 may change properties that indicate a display orientation, a display resolution, a physical display size, or a combination of two or more of these for the virtual display device 114.

When an application executes on the virtual machine 110, the application determines the properties of the virtual display device 114, which are the same as the properties of the display of the first client device 128a such that the virtual display device 114 mirrors the capabilities of the display of the first client device 128a. The application generates instructions for presentation of a user interface using the properties of the virtual display device 114.

The virtual machine 110 executes applications developed to execute on systems that have different types of displays, different types of input devices, or both. For instance, the virtual machine 110 executes applications developed to present content differently on different types of client devices, e.g., that have different presentation formats. When the virtual machine 110 executes an application, the application determines properties of the virtual machine 110, e.g., which simulate properties of the actual hardware of the client devices 128a-b that will present content for the application, and the application generates content for presentation using the properties of the virtual machine 110.

The application may use any appropriate method to determine a way in which to present content using the properties of the virtual machine 110, e.g., the virtual input devices 112, the virtual display devices 114, or both. For instance, the application may select a code path from multiple code paths using the properties of the virtual display 114. The selected code path allows the application to optimize the user interface for presentation on the display of the first client device 128a.

In the example shown in FIG. 1, the application is the user interface of an operating system of the virtual machine 110 and the user interface A 120a is an application menu. In some implementations, the application may be any appropriate application that executes on the virtual machine 110. For instance, the application may be a document editor, an image editor, a Web browser, an email client, a work productivity application, or another application.

The application may include, in the application menu user interface A 120a, a list of applications for the virtual machine to execute. For example, the menu in the user interface A 120a may include options for application A 122a, application B 124a, and application C 126a.

The application may generate the user interface A 120a using properties of the virtual input devices 112 in addition to the properties of the virtual display device 114. For instance, the application may determine that the virtual display device 114 has a resolution of 1920 by 1080 in a landscape mode and that the virtual input devices 112 include a virtual mouse and a virtual keyboard, based on the corresponding hardware properties for the first client device 128a and connected physical display devices and physical input devices. The application generates the user interface A 120a to include the menu that accepts input from the virtual mouse in which the menu items may be too small to be easily selected using touch screen input.

The host system 102 provides, at time $T_B$, instructions for the presentation of the user interface A 120a to the first client device 128a. For instance, the host system 102, e.g., the workspace service 107, communicates, via a network 130, with a virtual machine application installed on the first client device 128a to cause the first client device 128a to present the user interface A 120a on the external display that is connected to the first client device 128a. The virtual machine 110 may generate the instructions for the presentation of the user interface A 120a and provide the instructions to the host system 102. In response, the host system 102 provides, at time $T_B$, the instructions for the presentation of the user interface A 120a to the first client device 128a.

The host system 102, e.g., the workspace service 107, may use one or more remoting protocols to create a session with the first client device 128a. The host system 102 uses the session, and appropriate remoting protocols, to send the instructions for the presentation of the user interface A 120a to the first client device 128a. In some examples, the host system 102 may create the session for the virtual machine 110 with an application installed on the first client device 128a.

The host system 102 may receive data from the first client device 128a indicating user input selecting one of the applications, such as user input indicating a selection of the application A 122a using a mouse. For instance, the host system 102 receives the data from the first client device 128a and provides the data to the virtual machine 110.

The host system 102, e.g., the virtual machine 110 executing on the host system 102, may determine that the data indicate that a pointer for a virtual mouse moved over the option for the application A 120a in the user interface A 120a. The host system 102, e.g., the virtual machine 110, may determine that data indicates a mouse click of the option for the application A 120a while the mouse pointer hovered over the option for the application A 120a. The host system 102, e.g., the virtual machine 110, may perform appropriate actions in response to the data indicating selection of the option for the application A 120a, such as causing the virtual machine 110 to generate instructions for the presentation of the user interface A 120a.

The host system 102 receives data indicating the end of the first user session with the first client device 128a. In response, the host system 102 may suspend or halt the execution of the virtual machine 110 for the first client device.

At time $T_C$, the host system 102, e.g., the workspace service 107, receives a request from a second client device 128b for a second user session with the virtual machine 110. The host system 102, e.g., the workspace service 107, may determine that the request is specific to the virtual machine 110 using user credential information included in the request, an identifier for the second client device 128b, or any other appropriate data. For instance, the workspace service 107 may authenticate the user credential information and, in response, authorize the second client device 128b.

The host system 102 may determine that the second client device 128b is associated with the same user account as the first client device 128a during authorization. For instance, the workspace service 107 may receive the same user credential information from the second client device 128b as the user credential information, e.g., user name and password, received from the first client device 128a.

In some implementations, the host system 102 may determine that the second client device 128b has access to the same virtual machine 110, and the applications executing on the virtual machine 110, as the first client device 128a. For example, the workspace service 107 may determine that both the first client device 128a and the second client device 128b are operated by the same user or entity, e.g., business, and have access to the same virtual machine 110.

The host system 102 determines device properties for the second client device 128b. The host system 102 may determine display properties, input properties, or both, for the second client device 128b.

The host system 102 configures the virtual machine 110 using the device properties for the second client device 128b. For instance, the workspace service 107, the hypervisor 108, the virtual machine 110, or a combination of two or more of these working together, causes the virtual machine to morph the driver A 118a by changing a property of the driver A 118a or to load a driver B 118b so that the morphed driver or the loaded driver represents display properties for an integrated display included in the second client device 128b.

In some examples, the host system 102, e.g., the hypervisor 108, may handle virtual device change events. For instance, the hypervisor 108 may determine that the second client device 128b is a different device from the first client device 128a. The hypervisor 108 may determine the device properties for the second client device 128b, e.g., in response to determining that the second session is for a different device. The hypervisor 108 uses the device properties for the second client device 128b to change parameters of the virtual machine 110 to which the hypervisor 108 has access, e.g., the virtual device drivers 116. In response, the driver A 118a is notified of the changed parameters. The driver A 118a may use the changed parameters to notify an application executing on the virtual machine 110, e.g., the application generating the user interface A 120a to cause the application to generate an updated user interface for the changed parameters.

In some implementations, an agent running on the operating system of the virtual machine 110, e.g., a guest operating system, may handle virtual device change events. For instance, the agent may determine the device properties for the second client device 128b. The agent may determine that the device properties for the second client device 128b are different than properties of the first client device 128a. The agent may notify the hypervisor 108 of the change to the device properties, e.g., using guest-host communication mechanisms. In response, the hypervisor 108 configures the virtual device drivers 116 by morphing the driver A 118a or unloading the driver A 118a and loading the driver B 118b.

During the second user session when the virtual machine 110, e.g., an application executing on the virtual machine 110, generates a user interface, the virtual machine 110 uses the driver B 118b to determine settings for the user interface. For instance, the operating system of the virtual machine may use the driver B 118b to generate instructions for presentation of an application menu user interface 120b that includes a list of applications installed on the virtual machine 110 and available for execution. The operating system uses the driver B 118b to determine a layout and size for the application menu user interface 120b.

For example, the application determines a different code path from the multiple code paths using the updated properties for the virtual display device 114, e.g., that mirror the properties of the integrated display included in the second client device 128b. The application uses the different code path to generate the user interface that is optimized for presentation on the integrated display included in the second client device 128b.

The change from the driver A 118a to the driver B 118b may cause the application to determine that the hardware of the device on which the application is executing has changed. For instance, the application may determine that physical hardware connected to or integrated into a device executing the application has changed when the change was in the virtual hardware, e.g., the virtual display device 114, the virtual input device 112, or both, of the virtual machine 110. This may allow a more seamless cross-device experience when different devices present a user interface for a particular application.

The host system 102, e.g., the virtual machine 110, provides, at time TD, instructions for the presentation of the application menu user interface 120b to the second client device 128b. For instance, the virtual machine 110, e.g., the application such as a guest operating system user interface, generates the instructions and provides the instructions to the host system 102 for sending to the second client device 128b. The host system 102 may include the instructions in a single packet or multiple packets sent to the second client device 128b across a network 130.

The second client device 128b receives the instructions and presents the application menu user interface on a display integrated into the second client device 128b. For example, the second client device 128b is a smart phone and the second client device 128b uses the instructions to present the application menu user interface on a touch screen display included in the smart phone.

The application menu user interface B 120b may be specific to the second client device 128b in that the application menu user interface B 120b is designed to receive input via the touch screen display of the smart phone. For instance, the application menu user interface B 120b includes larger icons for touch input compared to the application menu user interface A 120a.

The application menu user interface B 120b may include a subset of the applications presented in the application menu user interface A 120a based on differences in display properties identified by the driver B 118b and the driver A 118a. In FIG. 1, the application menu user interface B 120b includes a menu option for an application A 122b and a menu option for an application B 124b. The application menu user interface B 120b may include an option to view additional menu options for other applications, e.g., the application C, that are not initially displayed in the application menu user interface B 120b but that are initially displayed in the application menu user interface A 120a.

The host system 102, e.g., the workspace service 107, the virtual machine 110, or both, may determine an application that was presented during a previous session and cause the presentation of a user interface for that application during a subsequent session for the same account. For instance, when the host system 102 ends the first user session with the first client device 128a, the host system 102, e.g., the virtual machine 110, may store state information that identifies the applications executing on the virtual machine 110 and current user interface information for each of the applications.

One example of an application may include a document editing application that is open to a specific location in a particular document. The guest operating system of the virtual machine 110, e.g., executed by the host system 102, may store state information that indicates the document editing application, the particular document, and the specific location in the particular document which the document editing application is presenting. For instance, the virtual machine 110 may suspend execution of the guest operating system and the applications executing on the guest operating system for later execution during another session.

When the host system 102 receives the request for the second user session from the second client device 128b, at time $T_C$, the guest operating system of the virtual machine 110 executing on the host system 102 determines the state information for the virtual machine 110 and configures the guest operating system and the applications executing on the guest operating system using the state information. For example, the guest operating system may use the state information to resume execution of the document editing application and position a user interface for the document editing application at the specific location in the particular document. When the device driver for the virtual machine 110 is configured according to the second client device 128b, the document editing application receives a "device change" alert, e.g., before first frame of old user interface for the document editing application is provided to the second client device 128b. The document editing application uses the "device change" alert to update its user interface, e.g., the document editing application morphs its user interface accordingly based on the device properties for the second client device 128b.

The presentation of the user interface for the document editing application and the specific location in the particular document is different for the first user session and the second user session. For instance, the virtual machine 110 uses different virtual device drivers 116 to generate the user interface which causes the differences in the presentation. A first presentation of the user interface showing the specific location of the particular document may include small menu items for selection by a mouse, e.g., connected to or included in the first client device 128a. A second presentation of the user interface, for use by the second client device 128b, showing the specific location of the particular document may include large menu items for selection via touch input, may include a virtual keyboard, or both.

In some implementations, a guest operating system for the virtual machine 110 may include a menu that accepts user input to adjust one or more settings for the virtual input devices 112, the virtual display devices 114, or both. For example, during the first user session with the first client device 128a, the guest operating system may generate a first "display options menu" using the driver A 118a for the virtual display device 114. The first display options menu includes selectable options specific to the external display connected to, and presenting content for, the first client device 128a. The guest operating system may include a display resolution option, a display orientation option, a text size option, another appropriate display option for the external display, or a combination of two or more of these.

The guest operating system may cause the presentation of the first display options menu on the external display. For example, the host system 102 may receive data representing user input from the first client device 128a that specifies a request for a display options menu, e.g., for a particular application executing on the virtual machine 110 or the guest operating system of the virtual machine 110. In response to receipt of the user input, the host system 102 provides the user input to the virtual machine 110. The virtual machine 110 causes the guest operating system to generate instructions for presentation of the first display options menu. The guest operating system provides the instructions to the first client device 128a, via the host system 102, to cause the first client device 128a to present the first display options menu on the external display.

During the second user session with the second client device 128b, the guest operating system for the virtual machine 110 may generate a second "display options menu" using the driver B 118b for the virtual display device 114. The guest operating system may include options for brightness, auto-brightness, e.g., based on ambient light, text size, bold text, or a combination of two or more of these, in the second display options menu. The display options in the second display options menu are specific to the second client device 128*b* and how the second client device 128*b* presents content to a user, e.g., via a touch screen display, while the display options in the first display options menu are specific to the first client device 128*a* and how the first client device 128*a* presents content to a user, e.g., via an external display.

The virtual machine 110 may provide instructions for presentation of the second display options menu to the second client device 128*b* to cause presentation of the second display options menu. For example, the host system 102 may receive data representing user input from the second client device 128*b* and provides the data to the virtual machine 110. The virtual machine 110, e.g., the guest operating system, determines that the data indicate a request for presentation of a display options menu. In response, the guest operating system generates instructions for the presentation of the second display options menu and provides the instructions to the second client device 128*b* via the host system 102. The guest operating system may generate the instructions in response to receipt of the request. In some examples, the guest operating system may generate the instructions prior to receipt of the request.

In some implementations, another component in the host system 102 may perform some or all of the steps described above with reference to the workspace service 107, the hypervisor 108, the virtual machine 110, the guest operating system, or a combination of two or more of these. For instance, an authentication module may authenticate the first user session and provide the hypervisor 108 with an indication that the first client device 128*a* requested a session with a virtual machine and has been authenticated.

The client devices 128*a-b* may include personal computers, mobile communication devices, and other devices that can send and receive data over a network. The network 130, such as a local area network (LAN), wide area network (WAN), the Internet, or a combination thereof, connects the client devices 128*a-b* and the host system 102.

Figure 2:
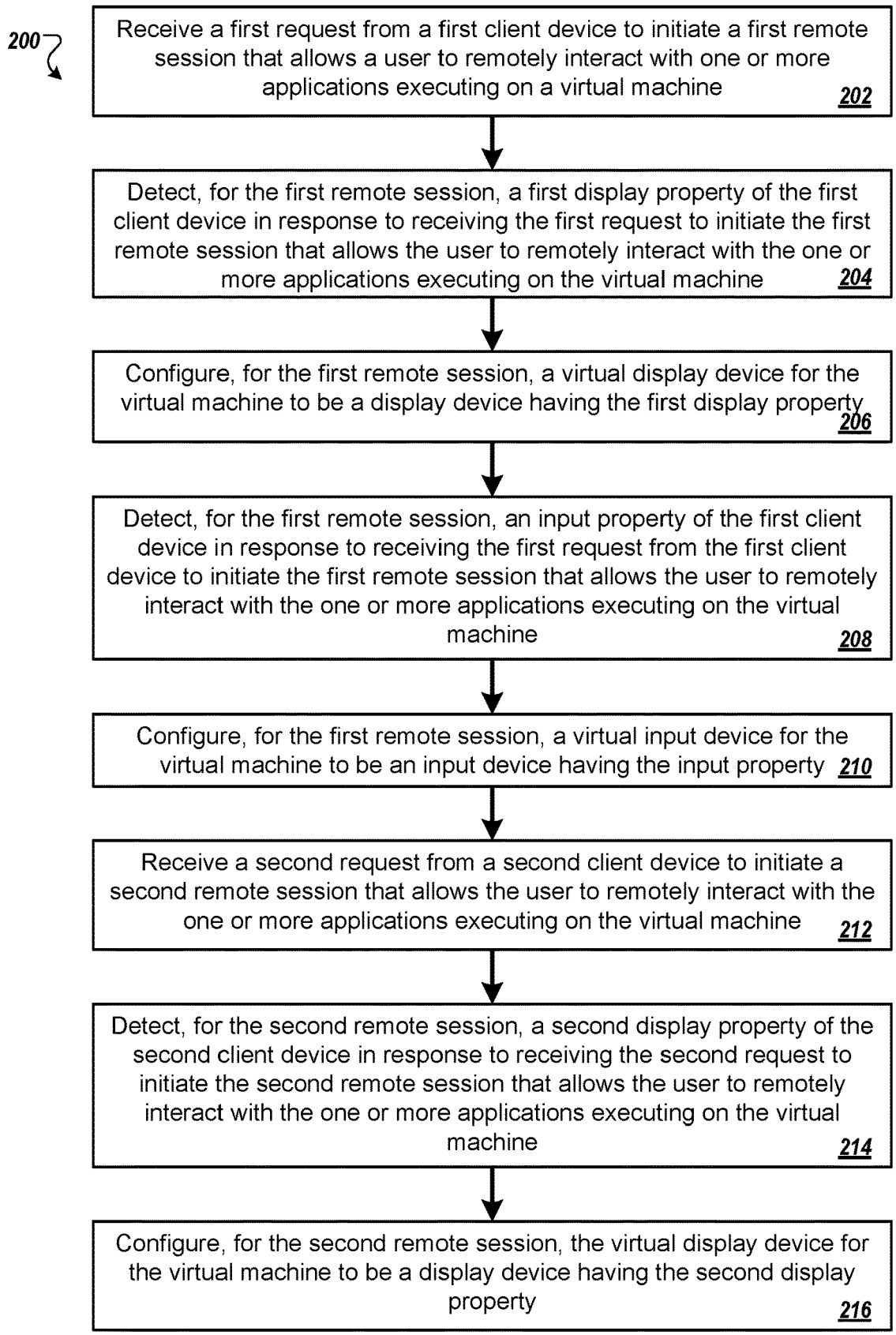
FIG. 2 is a flow diagram of a process for configuring virtual displays for different remote sessions that each present content for a particular virtual machine.

FIG. 2 is a flow diagram of a process 200 for configuring virtual displays for different remote sessions that each generate instructions for presentation of content for a particular virtual machine. The process can be implemented by one or more computer programs installed on one or more computers. For example, the process 200 can be used by the host system 102, e.g., the workspace service 107, the hypervisor 108, the virtual machine 110, or a combination of two or more of these, from the environment 100.

At 202, the host system receives a first request from a first client device to initiate a first remote session that allows a user to remotely interact with one or more applications executing on a virtual machine. The first request may include user credentials for a user of the first client device. The first request may include data indicating properties of the first user device. For instance, the data may indicate properties of an input device of the first user device, properties of a display of the first user device, or both. Some examples of input devices include computer mice, computer keyboards, and microphones.

At 204, the host system detects, for the first remote session, a first display property of the first client device in response to receiving the first request to initiate the first remote session that allows the user to remotely interact with the one or more applications executing on the virtual machine. The host system may use the data indicating properties of the first device from the first request to detect the first display property. In some examples, the host system may send the first client device a message requesting a value for the first display property from the first client device. In response, the host system may receive a message from the first client device that identifies a value for the first display property.

In some implementations, the host system may receive an identifier for the first client device, e.g., in the first request or in a response message from the first client device. The host system may use the identifier for the first client device to determine properties of the first client device including the first display property.

At 206, the host system configures, for the first remote session, a virtual display device for the virtual machine to be a display device having the first display property. For instance, the host system uses the first display property to determine a virtual display device driver for the virtual display device. The host system causes the virtual machine to load the virtual display device driver. Loading the virtual display device driver causes the virtual machine, and applications executing on the virtual machine, to generate instructions for presentation of user interfaces using the virtual display device driver, e.g., according to the first display property.

For example, the host system selects a virtual display device driver that is specific to the first display property. When the virtual machine and applications executing in the virtual machine generate instructions for presentation of user interfaces, the virtual machine and the applications executing in the virtual machine use the virtual display device driver, which is specific to the first display property and installed for a virtual display of the virtual machine, to generate instructions for presentation of corresponding user interfaces on a display with the first display property. Since the virtual display of the virtual machine has the first display property, the virtual machine and applications executing in the virtual machine are able to determine that the current display device is a display device having properties that match some or all of the properties of a display for the first user device.

The virtual machine may generate multiple different user interfaces specific to the first display property. For example, the virtual machine may generate a user interface for an operating system executing on the virtual machine, e.g., for a home screen of the operating system. The virtual machine may generate a second user interface for a document editing application executing on the virtual machine.

At 208, the host system detects, for the first remote session, an input property of the first client device in response to receiving the first request from the first client device to initiate the first remote session that allows the user to remotely interact with the one or more applications executing on the virtual machine. The input property may indicate a type of input for the first client device. Some examples of types of inputs include touch based input, e.g., a touch screen input, mouse input, e.g., trackpad or a physical computer mouse, and keyboard input.

At 210, the host system configures, for the first remote session, a virtual input device for the virtual machine to be an input device having the input property. For instance, the host system may use the input property to determine a virtual input device driver. The host system may cause the virtual machine to load the virtual input device driver or morph a currently loaded virtual input driver so that applications executing on the virtual machine generate instructions for presentation of user interfaces according to a virtual input device that has the input property, e.g., according to a virtual input device that matches some or all of the properties of a physical input device for the first client device.

In some implementations, an application executing on the virtual machine may generate the multiple different user interfaces that are each specific to the first display property and the input property of an input device of the first client device. For instance, the application may use one or both of the first display property and the input property to determine whether to include in a menu large icons, which are easier to select with a touch screen interface, or small icons, which can be selected by a mouse. Some examples features for different menu types may include large menu icons, small menu icons, drop down menus, pop-up menus, a particular font size, or a combination of two or more of these. The application may use a combination of small menu icons in a drop down menu when generating a menu for a desktop or a laptop. The application may use large menu icons or a combination of large menu icons and a pop-up menu when generating a menu for a touch screen device, e.g., a tablet or a smart phone. In some examples, the application may use a smaller font size for a virtual keyboard or virtual mouse input device, e.g., when the client device is a desktop, and a larger font size for a virtual touch screen input device.

At 212, the host system receives a second request from a second client device to initiate a second remote session that allows the user to remotely interact with the one or more applications executing on the virtual machine. For example, after the host system ends the first user session, the host system receives the second request. The second request may include an identifier for the second client device, the user credentials for the user of the second client device, which may be the same as the user credentials for the user of the first client device, or both.

At 214, the host system detects, for the second remote session, a second display property of the second client device in response to receiving the second request to initiate the second remote session that allows the user to remotely interact with the one or more applications executing on the virtual machine. The second display property may indicate that the second client device is a touch screen device, does not include a local virtual machine client, will present content in a web browser, or a combination of two or more of these.

At 216, the host system configures, for the second remote session, the virtual display device for the virtual machine to be a display device having the second display property. For example, the host system causes the virtual machine to load a virtual device driver that is specific to the second display property or causes the virtual machine to morph a virtual device driver so that the virtual device driver is specific to the second display property, e.g., and is no longer specific to the first display property.

In some examples, the host system may cause the virtual machine to unload, e.g., unplug, a first virtual device driver for the first display property and then load, e.g., plug in, a second virtual device driver for the second display property. In some implementations, the host system causes the virtual machine to load the second virtual device driver for the second display property when the virtual machine is initiated without any drivers or without a driver for a virtual display device.

The application uses the second display property to generate instructions for presentation of a user interface by the second client device. For instance, the application uses the second virtual device driver installed for the virtual display device that has one or more properties that match properties of the second client device, including the second display property, to generate instructions for presentation of the user interface and provides the instructions to the second client device. The second client device uses the instructions to present the user interface.

The application uses the second display property to generate the instructions prior to the virtual machine, and the host system, providing the second client device with data for a user interface of the application. For instance, the application updates its user interface using the second display property so that the user interface is specific to the second display property and no longer specific to the first display property. The application then provides, via the host system, the instructions for the user interface to the second client device.

The order of steps in the process 200 described above is illustrative only, and configuring the virtual displays for the different remote sessions that each present content for the particular virtual machine can be performed in different orders. For example, the host system may detect the input property and then detect the first display property. In some examples, the first request may include data identifying the first display property, the input property, or both.

In some implementations, the process 200 can include additional steps, fewer steps, or some of the steps can be divided into multiple steps. For example, the host system may perform steps 202 through 206 and 212 through 216 without performing steps 208 and 210.

In some implementations, a host system may change a configuration of a virtual machine upon detecting a change in an orientation of a user device's display, whether for a single session or multiple different sessions. For instance, the first display property may indicate that the user interface should be presented in a portrait mode and the second display property may indicate that the user interface should be presented in a landscape mode. In this example, the host system may configure, for the first user session, the virtual display device of the virtual machine to present content in a portrait mode by causing the virtual machine to load a first device driver for the portrait mode. The host system may configure, for the second user session, the virtual display device of the virtual machine to present content in a landscape mode by causing the virtual machine to load a second device driver for the landscape mode or to morph the first device driver into a driver for the landscape mode by changing properties of the first device driver.

Figure 3:
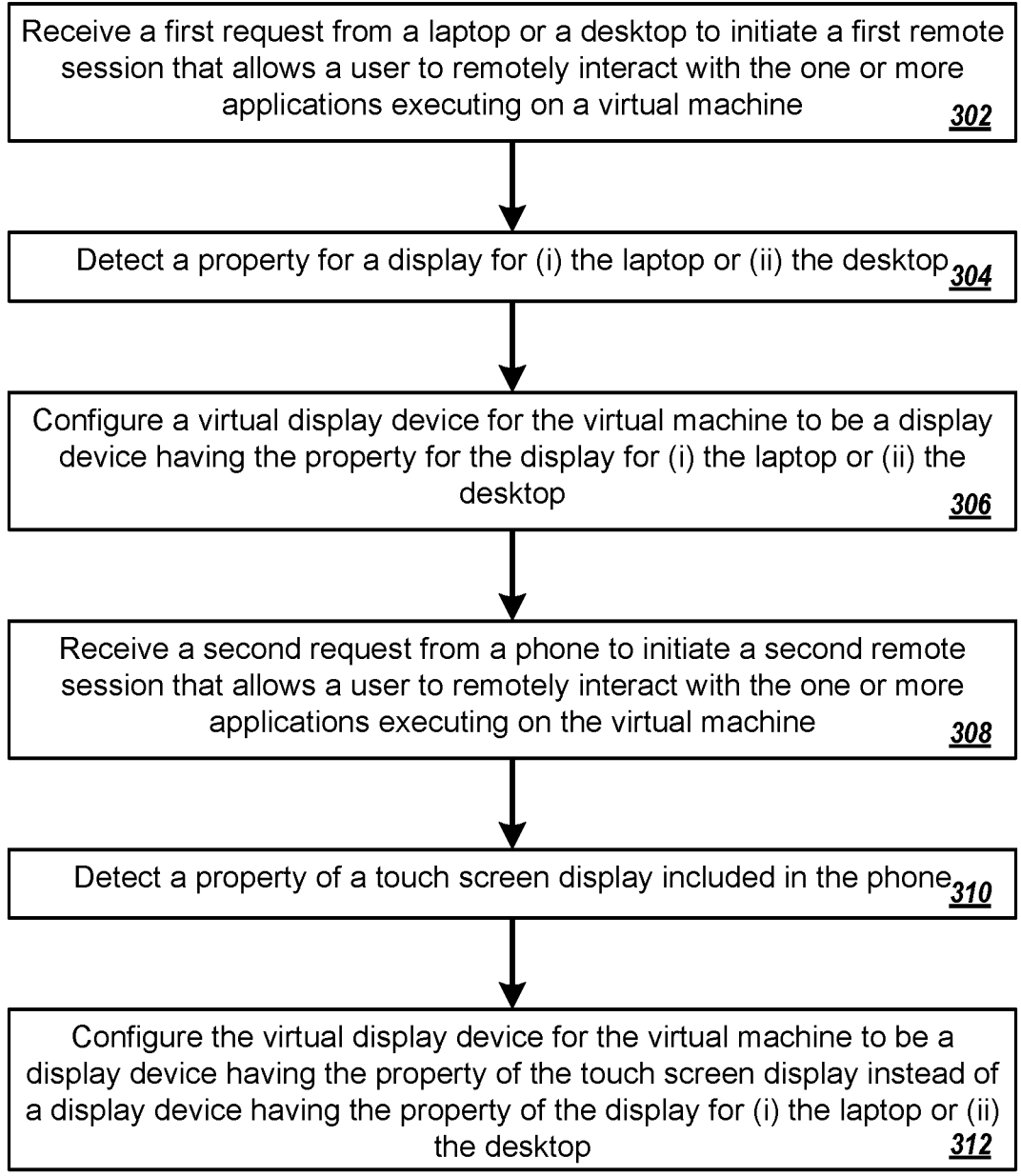
FIG. 3 is a flow diagram of a process for configuring a user interface of an application for presentation on a desktop or a laptop during a first session with a virtual machine and on a phone during a second session with the virtual machine.

FIG. 3 is a flow diagram of a process 300 for configuring a user interface of an application for presentation on a desktop or a laptop during a first session with a virtual machine and on a phone during a second session with the virtual machine. The process can be implemented by one or more computer programs installed on one or more computers. For example, the process 300 can be used by the host system 102 from the environment 100.

A host system receives a first request from a laptop or a desktop to initiate a first remote session that allows a user to remotely interact with the one or more applications executing on a virtual machine (302). For example, a workspace service executing on the host system may receive a request for access to a particular application.

The host system detects a property for a display for (i) the laptop or (ii) the desktop (304). For instance, the host system determines a display type, display resolution, or a display orientation for the display.

The host system configures a virtual display device for the virtual machine to be a display device having the property for the display for (i) the laptop or (ii) the desktop (306). An application executing on the host system may cause the virtual machine to configure the virtual display device to mirror the capabilities of the display. In some examples, the workspace service, the hypervisor, or both the workspace service and the hypervisor together, may cause the virtual machine to configure the virtual display device to mirror the display.

In some implementations, the workspace service and the hypervisor may execute on different servers included in the host system. For instance, the hypervisor may execute on a first server, either the same server that executes the virtual machine or a different server, and the workspace service may execute on a second server. The workspace service may request, from the hypervisor, an interface that allows the workspace service to configure the virtual machine. For instance, the workspace service may use the interface to invoke mechanisms of the virtual machine to cause the virtual machine to configure the virtual display device to mirror capabilities of the display.

The host system receives a second request from a phone to initiate a second remote session that allows a user to remotely interact with the one or more applications executing on the virtual machine (308). For example, after termination of the first session, the workspace service may receive the second request from a smart phone or another appropriate type of phone. The second request may indicate the particular application for the virtual machine to execute. In some examples, the workspace service or another application executing on the host system may determine that the particular application was presented during a most recent session for an account associated with the phone, e.g., during the first session, and that the particular application should be presented for the second session.

The host system detects a property of a touch screen display included in the phone (310). For instance, the host system determines a resolution and an orientation of the touch screen display.

The host system configures the virtual display device for the virtual machine to be a display device having the property of the touch screen display instead of a display device having the property of the display for (i) the laptop or (ii) the desktop (312). For example, the host system causes the virtual machine to install virtual device drivers for the virtual display device that cause the virtual display device to mirror the capabilities of the touch screen display.

Configuration of the virtual display device to mirror the capabilities of the touch screen display causes applications on the virtual machine to change a presentation format of content for the application. For instance, the application may execute a different code path, included in the application, that is specific to the touch screen display and is not specific to the display of the laptop or the desktop. The different code path may customize the presentation of the application's user interface for presentation on the touch screen display and would not be optimal for presentation on the display of the laptop or the desktop.

The order of steps in the process 300 described above is illustrative only, and configuring the user interface of the application for presentation on the desktop or the laptop during the first session with the virtual machine and on the phone during the second session with the virtual machine. For example, the host system may create the session with the phone and then create the session with the laptop or the desktop.

In some implementations, the process 300 can include additional steps, fewer steps, or some of the steps can be divided into multiple steps. For example, the host system may determine an input property of the laptop or an input property of the desktop and use the input property to configure a virtual input device of the virtual machine.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for dynamically configuring virtual displays and virtual inputs for different remote sessions that each present content for a virtual machine, comprising:

receiving, by one of one or more computers, a first request from a first client device to initiate a first remote session that allows a user of the first client device to remotely interact with one or more applications executing on the virtual machine, wherein the first request includes data indicating properties of an input device and a display device of the first client device, the properties including a first display property and a first input property of the first client device;

suspending, by the one or more computers, execution of the virtual machine for the first client device in response to receiving data indicating the end of the first remote session with the first client device;

receiving, by one of the one or more computers, a second request from a second client device to initiate a second remote session that allows the user to remotely interact with the one or more applications executing on the virtual machine, wherein the second request includes data indicating properties of a display device and an input device of the second client device, wherein the second client device is a different device than the first client device, and the second remote session is a different remote session from the first remote session; and in response to receiving the second request:
  detecting, by the one or more computers and for the second remote session, a second display property of the second client device and a second input property of the second client device using the data indicating properties of the display device and the input device of the second client device, wherein the second display property and second input property are different display property and input property from the first display property and first input property;
  configuring, by the one or more computers and for the second remote session, the virtual display device for the virtual machine to be a display device having the second display property, wherein the configuring includes determining a second virtual display device driver for the virtual display device using the second display property, causing the virtual machine to unload the first virtual display device driver, and to load the second virtual display device driver;
  in response to the virtual display device being configured to have the second display property, causing, the one or more applications on the virtual machine to change a presentation format of content for the one or more applications by dynamically switching from a first code path executed by the one or more applications that is specific to the display device having the first display property to a second code path that is specific to the display device having the second display property so as to adapt respective user interfaces generated by the executing one or more applications from user interfaces generated according to the first display property to user interfaces generated according to the second display property; and
  configuring, by the one or more computers and for the second remote session, a virtual input device to be an input device having the second input property, wherein configuring includes determining a virtual input device driver for the virtual input device using the second input property, and causing the virtual machine to load the virtual input device driver.

2. The method of claim 1, wherein configuring the virtual input device for the virtual machine to be an input device having the second input property comprises configuring an input driver to have the second input property.

3. The method of claim 1, comprising:
  determining, for the first remote session, a type of input device using the first input property;
  selecting, for the first remote session, one of a plurality of menu types using the type of input device; and
  presenting, for the first remote session, the selected one of the plurality of menu types in response to selecting the one of the plurality of menu types using the type of input device.

4. The method of claim 3, wherein:
  determining the type of input device using the first input property comprises determining whether the first client device receives (i) touch based input or (ii) mouse and keyboard input using the first input property; and
  selecting one of the plurality of menu types using the type of input device comprises selecting a (i) touch interface menu or (ii) a mouse interface menu using the determined type of input.

5. The method of claim 1, comprising:
  determining, for the first remote session, first display options for the virtual display device using the first display property;
  generating, for the first remote session, instructions for a presentation of the first display options for the virtual display device;
  determining, for the second remote session, second display options for the virtual display device using the second display property; and
  generating, for the second remote session, instructions for a presentation of the second display options for the virtual display device, the second display options having at least one option that is not included on the first display options.

6. The method of claim 5, wherein:
  generating the instructions for the presentation of the first display options for the virtual display device comprises generating the instructions for a presentation of an option to select a font size from a first group of font sizes for text presented during the first remote session; and
  generating the instructions for the presentation of the second display options for the virtual display device comprises generating the instructions for a presentation of an option to select a font size from a second group of font sizes for text presented during the second remote session, at least one of the font sizes in the first group of font sizes not included in the second group of font sizes.

7. The method of claim 5, comprising:
  providing, to the first client device for the first remote session, the instructions for a presentation of the first display options for the virtual display device to cause the first client device to present the first display options; and
  providing, to the second client device for the second remote session, the instructions for a presentation of the second display options for the virtual display device to cause the second client device to present the second display options.

8. The method of claim 1, wherein:
  receiving the first request from the first client device to initiate the first remote session that allows the user to remotely interact with the one or more applications executing on the virtual machine comprises receiving the first request from a laptop or a desktop to initiate the first remote session that allows the user to remotely interact with the one or more applications executing on the virtual machine; and
  in response to receiving the first request:
    detecting the first display property of the first client device comprises detecting a first property for a first display for (i) the laptop or (ii) the desktop in response to receiving the first request to initiate the first remote session that allows the user to remotely interact with the one or more applications executing on the virtual machine; and
    configuring the virtual display device for the virtual machine to be a display device having the first display property comprises configuring the virtual display device for the virtual machine to be a display device having the first property for the first display for (i) the laptop or (ii) the desktop; and
  wherein:
  receiving the second request from the second client device to initiate the second remote session that allows the user to remotely interact with the one or more applications executing on the virtual machine comprises receiving the second request from a smart phone to initiate the second remote session that allows the user to remotely interact with the one or more applications executing on the virtual machine;

detecting the second display property of the second client device comprises detecting a second property of a second display included in the smart phone in response to receiving the second request to initiate the second remote session that allows the user to remotely interact with the one or more applications executing on the virtual machine; and dynamically configuring the virtual display device for the virtual machine to be a display device having the second display property while the virtual machine continues to execute the one or more applications comprises dynamically configuring the virtual display device for the virtual machine to be a display device having the second property of the second display instead of a display device having the property of the display for (i) the laptop or (ii) the desktop while the virtual machine continues to execute the one or more applications.

9. The method of claim 8, wherein:

detecting the first input property of the first client device comprises detecting, for the first remote session, keyboard properties and mouse properties for the laptop or the desktop;

configuring the virtual input device for the virtual machine to be an input device having the first input property comprises:
 configuring, for the first remote session, a virtual mouse input device for the virtual machine to be an input device having the mouse properties; and
 configuring, for the first remote session, a virtual keyboard input device for the virtual machine to be an input device having the keyboard properties;

detecting the second input property of the second client device comprises detecting, for the second remote session, touch screen properties of a touch screen for the smart phone, wherein the second display included in the smart phone comprises the touch screen; and dynamically configuring the virtual input device for the virtual machine to be an input device having the second input property comprises configuring, for the second remote session, a virtual touch screen for the virtual machine to be an input device having the touch screen properties the method comprising:

disabling, for the second remote session, the virtual mouse input device.

10. The method of claim 1, wherein configuring the virtual display device for the virtual machine to be a display device having the first display property comprises configuring a display driver to have the first display property.

11. A system comprising:

one or more computers configured to interact with a first client device and a second client device and to perform operations for dynamically configuring virtual displays and virtual inputs for different remote sessions that each present content for a virtual machine, comprising:
 receiving a first request from the first client device to initiate a first remote session that allows a user of the first client device to remotely interact with one or more applications executing on the virtual machine, wherein the first request includes data indicating properties of an input device and a display device of the first client device, the properties including a first display property and a first input property of the first client device;
 suspending, by the one or more computers, execution of the virtual machine for the first client device in response to receiving data indicating the end of the first remote session with the first client device;
 receiving a second request from the second client device to initiate a second remote session that allows the user to remotely interact with the one or more applications executing on the virtual machine, wherein the second request includes data indicating properties of a display device and an input device of the second client device, wherein the second client device is a different device than the first client device, and the second remote session is a different remote session from the first remote session; and
 in response to receiving the second request:
  detecting, for the second remote session, a second display property of the second client device and a second input property of the second client device using the data indicating properties of the display device and the input device of the second client device, wherein the second display property and second input property are different display property and input property from the first display property and first input property
  configuring, for the second remote session, the virtual display device for the virtual machine to be a display device having the second display property, wherein the configuring includes determining a second virtual display device driver for the virtual display device using the second display property, causing the virtual machine to unload the first virtual display device driver, and to load the second virtual display device driver;
  in response to the virtual display device being configured to have the second display property, causing, the one or more applications on the virtual machine to change a presentation format of content for the one or more applications by dynamically switching from a first code path executed by the one or more applications that is specific to the display device having the first display property to a second code path that is specific to the display device having the second display property so as to adapt respective user interfaces generated by the executing one or more applications from user interfaces generated according to the first display property to user interfaces generated according to the second display property; and
  configuring, for the second remote session, a virtual input device to be an input device having the second input property, wherein configuring includes determining a virtual input device driver for the virtual input device using the second input property, and causing the virtual machine to load the virtual input device driver.

12. The system of claim 11, wherein the one or more computers comprise a server operable to interact with the first device and the second device through a data communication network, and both the first client device and the second client device are configured to interact with the server as a client.

13. The system of claim 12, wherein the first client device comprises a personal computer.

14. The system of claim 12, wherein the second client device comprises a mobile telephone or a tablet.

15. A non-transitory computer storage medium encoded with instructions that, when executed by one or more computers, cause the one or more computers to perform operations for dynamically configuring virtual displays and virtual inputs for different remote sessions that each present content for a virtual machine, comprising:

receiving a first request from a first client device to initiate a first remote session that allows a user of the first client device to remotely interact with one or more applications executing on the virtual machine, wherein the first request includes data indicating properties of an input device and a display device of the first client device, the properties including a first display property and a first input property of the first client device;

suspending, by the one or more computers, execution of the virtual machine for the first client device in response to receiving data indicating the end of the first remote session with the first client device;

receiving a second request from a second client device to initiate a second remote session that allows the user to remotely interact with the one or more applications executing on the virtual machine, wherein the second request includes data indicating properties of a display device and an input device of the second client device, wherein the second client device is a different device than the first client device, and the second remote session is a different remote session from the first remote session; and in response to receiving the second request:

detecting, for the second remote session, a second display property of the second client device and a second input property of the second client device using the data indicating properties of the display device and the input device of the second client device, wherein the second display property and second input property are different display property and input property from the first display property and first input property;

configuring, for the second remote session, the virtual display device for the virtual machine to be a display device having the second display property, wherein the configuring includes determining a second virtual display device driver for the virtual display device using the second display property, causing the virtual machine to unload the first virtual display device driver, and to load the second virtual display device driver;

in response to the virtual display device being configured to have the second display property, causing, the one or more applications on the virtual machine to change a presentation format of content for the one or more applications by dynamically switching a code path executed by the one or more applications that is specific to the display device having the first display property to a second code path that is specific to the display device having the second display property so as to adapt respective user interfaces generated by the executing one or more applications from user interfaces generated according to the first display property to user interfaces generated according to the second display property; and configuring, for the second remote session, a virtual input device to be an input device having the second input property, wherein configuring includes determining a virtual input device driver for the virtual input device using the second input property, and causing the virtual machine to load the virtual input device driver.

16. The computer storage medium of claim 15, wherein configuring the virtual input device for the virtual machine to be an input device having the second input property comprises configuring an input driver to have the second input property.

17. The computer storage medium of claim 15, the operations comprising:

determining, for the first remote session, a type of input device using the first input property;

selecting, for the first remote session, one of a plurality of menu types using the type of input device; and presenting, for the first remote session, the selected one of the plurality of menu types in response to selecting the one of the plurality of menu types using the type of input device.

* * * * *